(12) United States Patent
Clyde

(10) Patent No.: US 10,246,045 B2
(45) Date of Patent: Apr. 2, 2019

(54) HARNESS BAR ASSEMBLY

(71) Applicant: Ford Global Technologies, LLC, Dearborn, MI (US)

(72) Inventor: David Clyde, Southfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/585,836

(22) Filed: May 3, 2017

(65) Prior Publication Data

US 2018/0319360 A1 Nov. 8, 2018

(51) Int. Cl.
| | |
|---|---|
| *B60N 2/01* | (2006.01) |
| *B60N 2/06* | (2006.01) |
| *B60R 22/12* | (2006.01) |
| *B60R 22/22* | (2006.01) |
| *B60R 22/26* | (2006.01) |
| *B60R 22/18* | (2006.01) |

(52) U.S. Cl.
CPC .............. *B60R 22/26* (2013.01); *B60N 2/012* (2013.01); *B60R 22/12* (2013.01); *B60R 22/22* (2013.01); *B60N 2/06* (2013.01); *B60R 2022/1818* (2013.01); *B60R 2022/263* (2013.01); *B60R 2022/266* (2013.01)

(58) Field of Classification Search
CPC ......... B60R 22/12; B60R 22/22; B60R 22/26; B60R 22/30; B60R 2022/1818; B60R 2022/263; B60R 2022/266; B60N 2/012; B60N 2/06; B60N 2/688; D03D 1/0005
See application file for complete search history.

(56) References Cited

U.S. PATENT DOCUMENTS

| | | | | |
|---|---|---|---|---|
| 2,823,046 | A | * | 2/1958 | Banta ...................... B60R 22/02 297/471 |
| 3,887,233 | A | * | 6/1975 | Garavaglia ............. B60R 22/26 297/478 |
| 5,112,100 | A | | 5/1992 | Murkett et al. |
| 5,376,440 | A | * | 12/1994 | Koseki ................. D03D 1/0005 139/383 R |
| 5,628,548 | A | * | 5/1997 | Lacoste ................... B60R 22/02 297/464 |
| 5,910,457 | A | * | 6/1999 | Kolb .................... D03D 1/0005 139/383 R |

(Continued)

FOREIGN PATENT DOCUMENTS

| | | |
|---|---|---|
| DE | 2103611 A1 | 8/1972 |
| EP | 0548461 A1 | 6/1993 |
| GB | 2376212 A | 12/2002 |

OTHER PUBLICATIONS

Eric, "Wrapping Takata Shoulder Belts on a Harness Bar," Double D Garage, www.doublegarage.com; Nov. 18, 2009; 8 pages.

(Continued)

*Primary Examiner* — Laura Freedman
(74) *Attorney, Agent, or Firm* — Frank A. MacKenzie; Bejin Bieneman PLC

(57) ABSTRACT

A vehicle includes a body. A front seat and a rear seat are each supported by the body. A seat belt buckle is supported by the rear seat. A harness bar is supported by the body and disposed between the front seat and the rear seat. A webbing is attached to the harness bar. A tongue is attached to the webbing. The tongue is engageable with the seat belt buckle.

19 Claims, 5 Drawing Sheets

(56) References Cited

U.S. PATENT DOCUMENTS

| | | | | |
|---|---|---|---|---|
| 6,123,388 A * | 9/2000 | Vits | ............ | B60N 2/688 |
| | | | | 297/216.13 |
| 6,234,529 B1 | 5/2001 | Ellison et al. | | |
| 6,293,588 B1 * | 9/2001 | Clune | ............ | B60R 21/02 |
| | | | | 180/268 |
| 6,305,713 B1 | 10/2001 | Pywell et al. | | |
| 6,533,320 B1 * | 3/2003 | Langensiepen | ......... | B60R 22/02 |
| | | | | 280/801.1 |
| 6,655,718 B2 * | 12/2003 | Eusebi | ............ | B60R 22/00 |
| | | | | 280/801.1 |
| 6,698,795 B2 * | 3/2004 | Enomoto | ............ | B60J 5/0479 |
| | | | | 280/808 |
| 8,590,934 B2 | 11/2013 | Fruehauf et al. | | |
| 8,632,131 B2 | 1/2014 | Humbert | | |
| 8,783,782 B2 | 7/2014 | Park | | |

OTHER PUBLICATIONS

Search Report from United Kingdom Intellectual Property Office dated Nov. 1, 2018 regarding Application No. GB1807191.0 (3 pages).

* cited by examiner

HARNESS BAR ASSEMBLY

BACKGROUND

In a vehicle racing environment, a multi-point harness may be used to secure a driver and/or passenger in a vehicle. A vehicle designed for racing may have a roll cage, and part of the multi-point harness may attach to the roll cage. In the alternative to, or in addition to the roll bar, a vehicle may use a harness bar, and part of the multi-point harness may attach to the harness bar.

DETAILED DESCRIPTION

Figure 1:
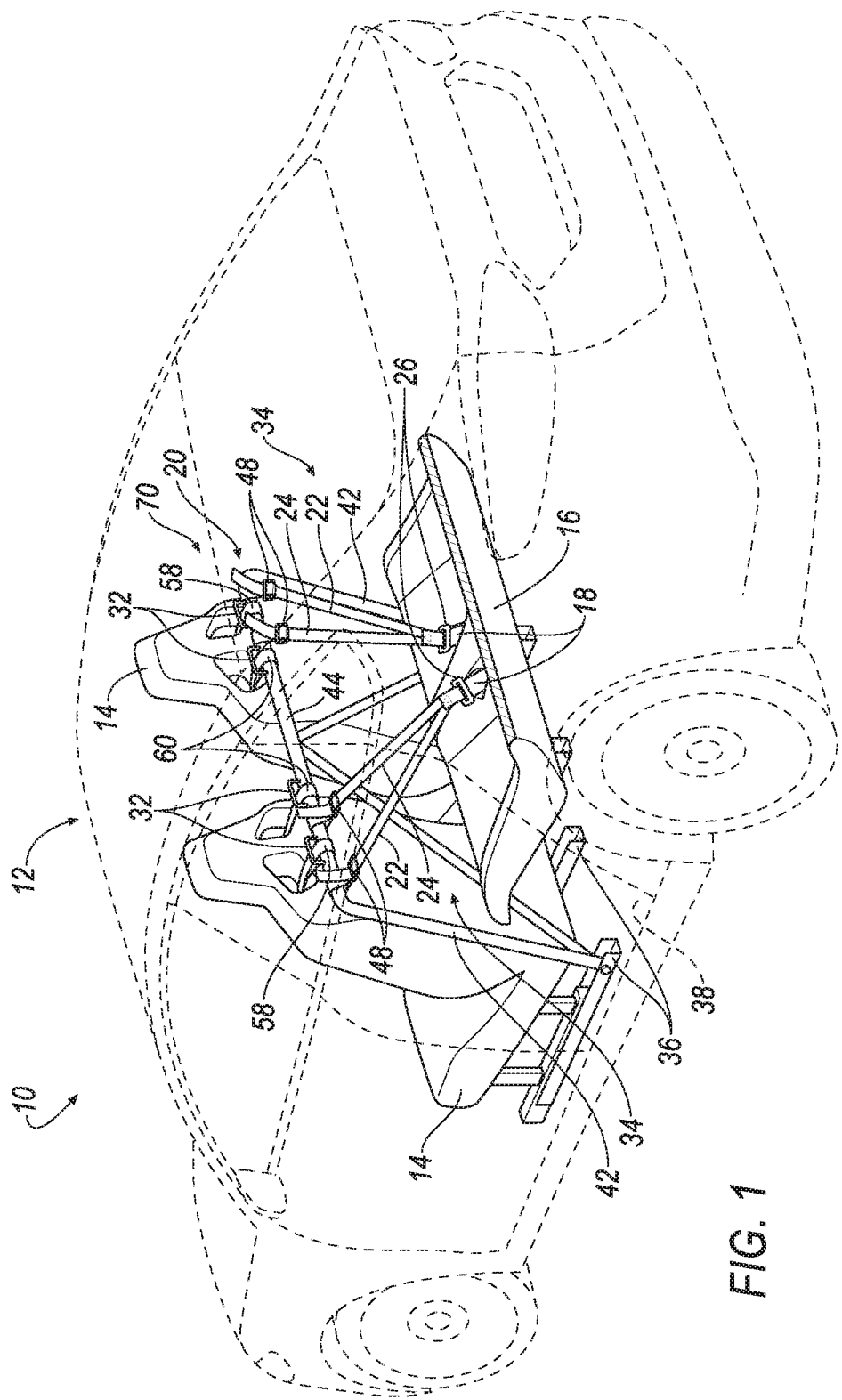
FIG. 1 is a perspective view of a vehicle including a harness bar assembly.

A vehicle includes a body. A front seat and a rear seat are each supported by the body. A seat belt buckle is supported by the rear seat. A harness bar is supported by the body and disposed between the front seat and the rear seat. A webbing is attached to the harness bar. A tongue is attached to the webbing. The tongue is engageable with the seat belt buckle.

The vehicle may include a shoulder strap attached to the harness bar.

The vehicle may include a front seat belt buckle supported by the front seat and a front tongue attached to the shoulder strap. The front tongue may be engageable with the front seat belt buckle.

The vehicle may include a guide attached to the harness bar. A portion of the shoulder strap may be disposed between the guide and the harness bar.

The body may include front seat rails. The front seat and the harness bar may each be supported by the front seat rails.

The body may include a floor. The harness bar may be supported by the floor.

The webbing may have a length from the harness bar to the tongue. The webbing may include an adjustment mechanism designed to adjust the length of the webbing.

The tongue may be fixed to the webbing.

The vehicle may include a second webbing attached to the harness bar. The tongue may be attached to the second webbing.

The webbing may extend in a first direction from the harness bar to the tongue. The webbing may be designed to stretch in the first direction when a tension force is exerted on the webbing in the first direction.

The webbing may be a fabric having a weave pattern. An amount in which the webbing stretches in the first direction when a tension force is exerted on the webbing in the first direction may be determined by at least the weave pattern of the fabric.

The harness bar may be tubular.

A harness bar assembly includes a harness bar configured to attach to a body of a vehicle. A webbing is attached to the harness bar. A tongue is attached to the webbing. The tongue is configured to engage a seat belt buckle on a rear seat of the vehicle.

The harness bar assembly may include a shoulder strap attached to the harness bar.

The harness bar assembly may include a front tongue attached to the shoulder strap. The front tongue may be configured to engage a front seat belt buckle on a front seat of the vehicle.

The harness bar assembly may include a guide attached to the harness bar. A portion of the shoulder strap may be disposed between the guide and the harness bar.

The webbing may have a length from the harness bar to the tongue. The webbing may include an adjustment mechanism designed to adjust the length of the webbing.

The webbing may extend in a first direction from the harness bar to the tongue. The webbing may be designed to stretch in the first direction when a tension force is exerted on the webbing in the first direction.

The webbing may be a fabric having a weave pattern. An amount in which the webbing stretches in the first direction when a tension force is exerted on the webbing in the first direction may be determined by at least the weave pattern of the fabric.

The harness bar may be tubular.

With reference to the Figures, wherein like numerals indicate like parts throughout the several views, a vehicle 10 is generally shown in FIG. 1. The vehicle 10 includes a body 12. A front seat 14 and a rear seat 16 are each supported by the body 12. A seat belt buckle 18 is supported by the rear seat 16. A harness bar 20 is supported by the body 12 and disposed between the front seat 14 and the rear seat 16. A webbing 22 is attached to the harness bar 20. A tongue 26 is attached to the webbing 22. The tongue 26 is engageable with the seat belt buckle 18.

By utilizing the webbing 22 attached to the harness bar 20 and the tongue 26 attached to the webbing 22, the harness bar 20 may be partially secured to the vehicle 10 by the tongue 26 engaging the seat belt buckle 18. This configuration may reduce the number of interior pieces of the vehicle that may otherwise need to be modified or removed during installation of the harness bar 20. As another example, this configuration may allow the harness bar 20 to be inserted into a variety of vehicles by adjusting the webbing 22.

As set forth above, the vehicle 10 includes a body 12. The vehicle 10 may be, for example, any suitable passenger automobile. The body 12 and a frame (not numbered) may be of a unibody construction. In the unibody construction, the body 12, e.g., front seat rails 36, a floor 38, a pillar (not shown), serves as the vehicle frame, and the body 12 (including the front seat rails 36, the floor 38, the pillar, etc.) is unitary, i.e., a continuous one-piece unit. As another example, the body 12 and the frame may have a body-on-frame construction (also referred to as a cab-on-frame construction). In other words, the body 12 and the frame are separate components, i.e., are modular, and the body 12 is supported on and affixed to the frame. Alternatively, the body 12 and the frame may have any suitable construction. The body 12 and/or the frame may be formed of any suitable material, for example, steel, aluminum, etc.

The vehicle 10 may include more than one front seat 14, as shown in FIG. 1. For example, the front seats 14 may be captain chairs. The vehicle 10 may include one rear seat 16, as shown in FIG. 1, e.g., a bench seat, or alternatively may include more than one rear seat 16.

As set forth above, the front seat 14 and the rear seat 16 are each supported by the body 12, e.g., the floor 38. The front seat 14 may be positioned in front of the rear seat 16, i.e., the front seat 14 may be closer to a front of the vehicle 10 than the rear seat 16. For example, the front seat 14 may be a driver seat or a front passenger seat, and the rear seat 16 may be a rear passenger seat. As shown in FIG. 1, the vehicle 10 may include two front seats 14 and two rear seats 16.

The front seat 14 and the rear seat 16 may each be supported by the body 12 in any suitable manner, for example, by fasteners, welding, adhesive, etc. The body 12 may include the front seat rails 36 and the front seat 14 may be supported by the front seat rails 36. The front seat 14 may be slidable along the front seat rails 36. As another example, the front seat 14 may be fixed to the front seat rails 36. The front seat rails 36 may have any suitable cross section, for example, a generally U-shaped cross section. The front seat rails 36 may be formed of any suitable material, for example, steel, aluminum, etc.

As set forth above, the seat belt buckle 18 is supported by the rear seat 16. The seat belt buckle 18 may be, for example, any type of conventional seat belt buckle configured to releasably engage a clip on a webbing of a seat belt assembly to fasten an occupant to the rear seat 16, as is known. The seat belt buckle 18 may be factory-installed.

The seat belt buckle 18 may be supported by the rear seat 16 in any suitable and conventional manner, for example, by fasteners, welding, adhesive, etc. The seat belt buckle 18 may include a conventional slot (not shown), as is known to receive the clip on the webbing of the seat belt assembly. The seat belt buckle 18 may include a conventional button (not shown), as is known to release the clip from the slot. The slot may be configured to receive the tongue 26. The button may be configured to release the tongue 26 from the seat belt buckle 18. As shown in FIG. 1, the vehicle 10 may include two seat belt buckles 18. Alternatively, there may be any suitable number of seat belt buckles 18.

With reference to FIGS. 1-5, a harness bar assembly 70 includes the harness bar 20 configured to attach to the body 12 of the vehicle 10 and a webbing assembly 34 attached to the harness bar 20. The webbing assembly 34 includes the webbing 22 attached to the harness bar 20 and the tongue 26 attached to the webbing 22. The tongue 26 is configured to engage the seat belt buckle 18 on the rear seat 16 of the vehicle 10.

Figure 3:
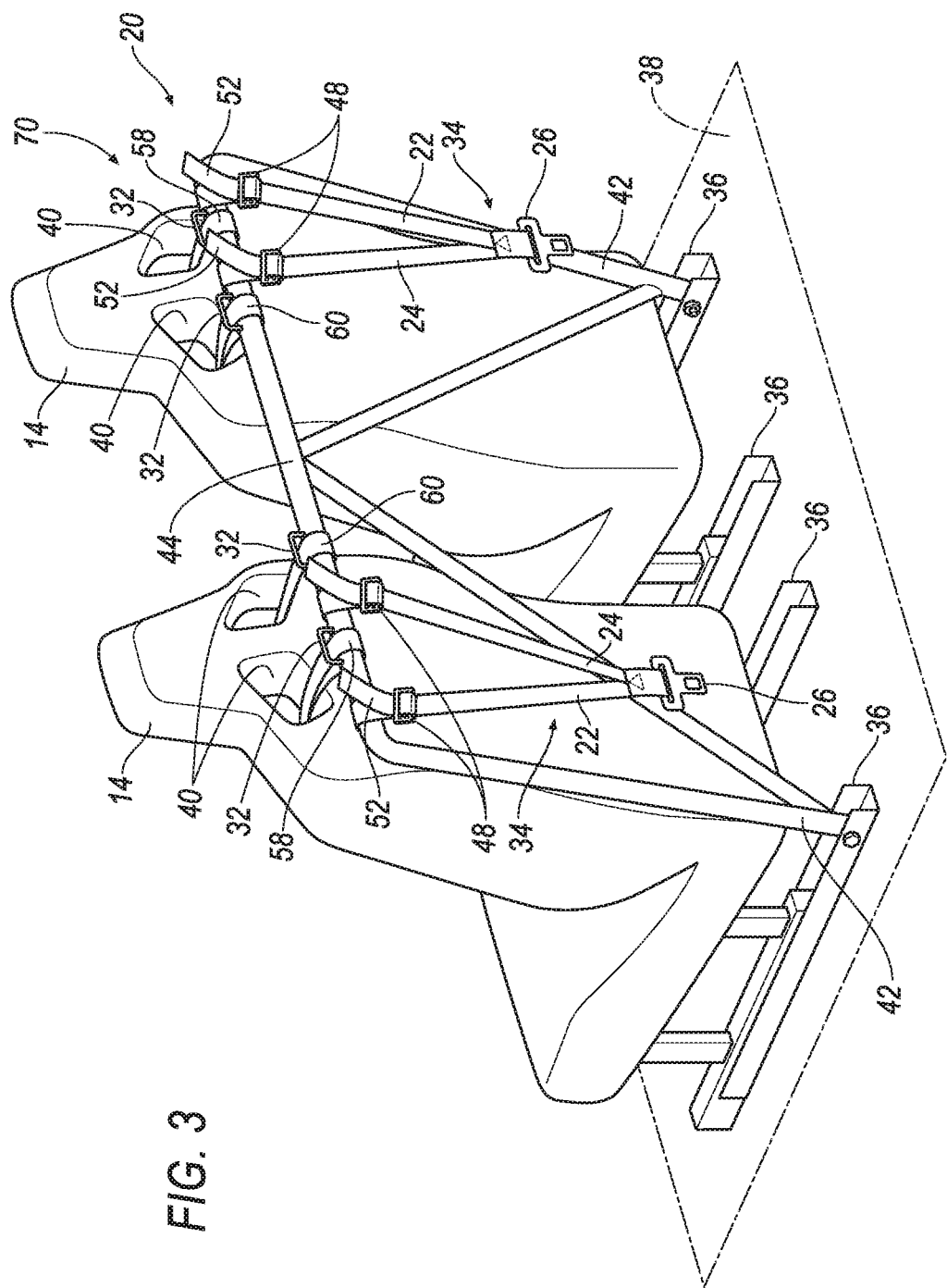
FIG. 3 is a perspective view of the front seat and the harness bar assembly supported by a body of the vehicle in one exemplary manner.

As set forth above, the harness bar 20 is supported by the body 12. The harness bar 20 may be supported by the body 12 in any suitable manner, for example, by fasteners, welding, adhesive, etc. As one example, as shown in FIG. 3, the harness bar 20 may be supported by the front seat rails 36. The harness bar 20 may include support beams 42 and a harness beam 44 extending from one of the support beams 42 to the other of the support beams 42. The support beams 42 may engage the front seat rails 36. For example, the front seat rails 36 may have a channel and the support beams 42 may be supported by the front seat rails 36 in the channel.

Figure 4:
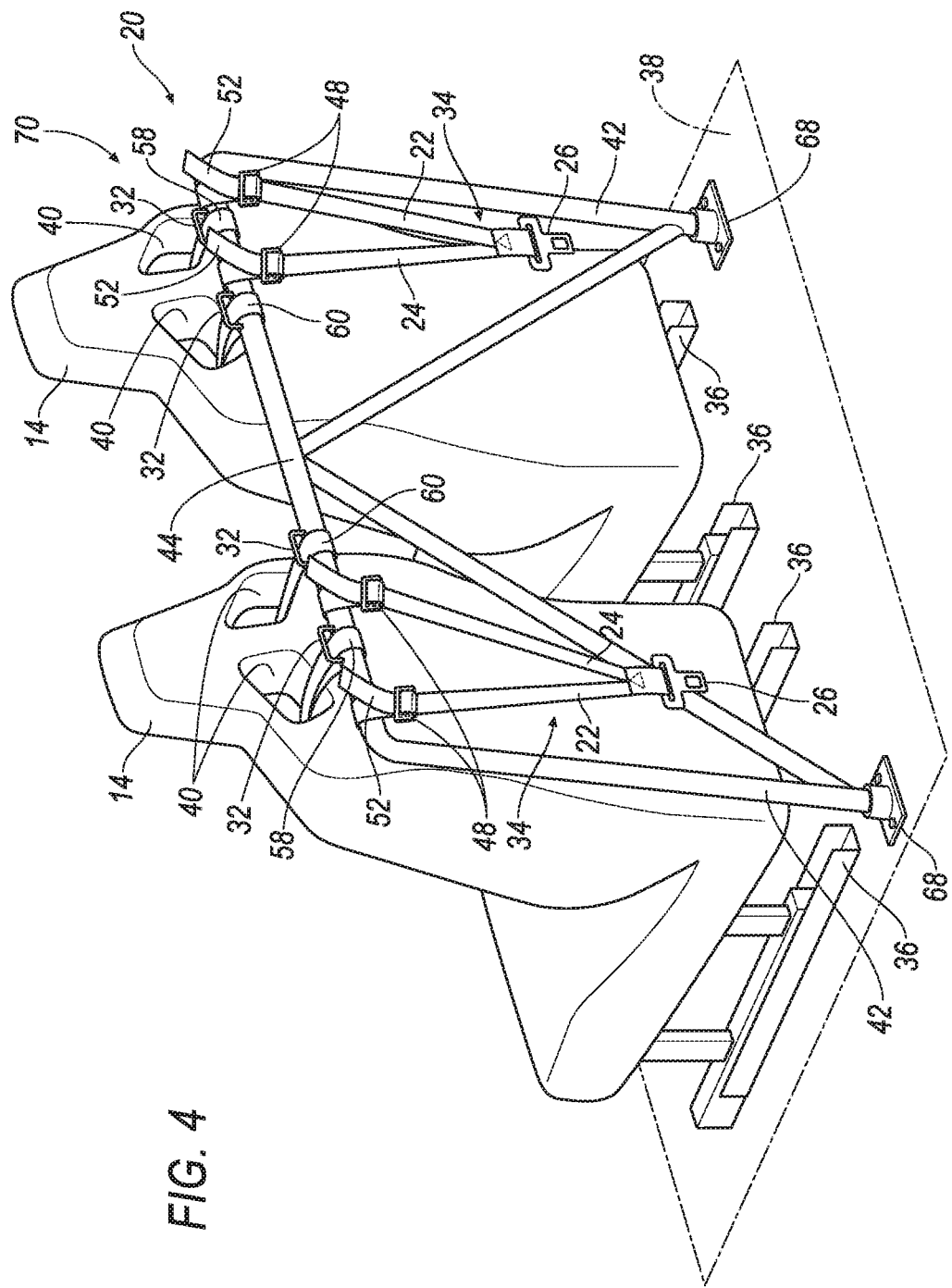
FIG. 4 is a perspective view of the front seat and the harness bar assembly supported by the body of the vehicle in another exemplary manner.

As another example, as shown in FIG. 4, the body 12 may include the floor 38, and the harness bar 20 may be directly supported by the floor 38. For example, the support beam 42 may be supported by a bracket 68, and the bracket 68 may be directly supported by the floor 38. As shown in FIG. 4, the vehicle 10 may include two brackets 68, each supporting one of the support beams 42. Alternatively, there may be any suitable number of brackets 68 and support beams 42. As another example, the body 12 may include the pillar and the harness bar 20 is supported by the pillar. The pillar may be, for example, a B pillar, a C pillar, etc.

As set forth above, the harness bar 20 is disposed between the front seat 14 and the rear seat 16. As one example, the harness bar 20 may abut the front seat 14, the rear seat 16, or both the front seat 14 and the rear seat 16. As another example, the harness bar 20 may be spaced from one or both of the front seat 14 and the rear seat 16. As shown in FIGS. 1-4, the harness beam 44 may extend in a generally cross-vehicle direction. For example, the harness beam 44 may be generally elongated in the cross-vehicle direction.

The harness bar 20 may be tubular. That is, the harness bar 20 may have a generally circular cross section. Alternatively, the harness bar 20 may have any suitable cross section, for example, a rectangular cross section, an elliptical cross section, etc. The harness bar 20 may be formed of any suitable material, for example, steel, aluminum, etc.

Figure 2:
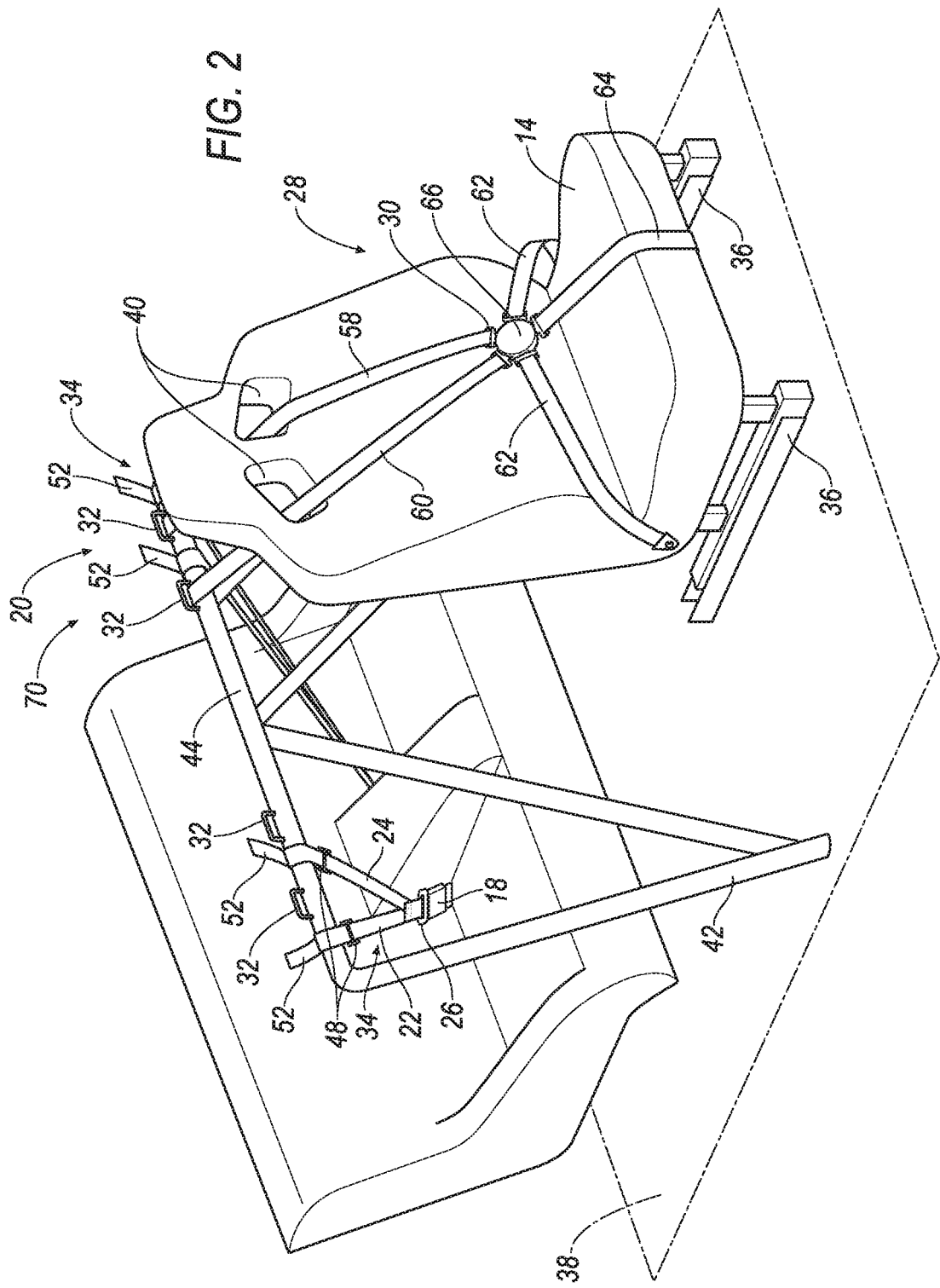
FIG. 2 is a perspective view of a front seat, a rear seat, and the harness bar assembly.

The webbing assembly 34 may include a second webbing 24 attached to the harness bar 20. The webbing 22 and the second webbing 24 may be attached to the harness bar 20 in any suitable manner, for example, by fasteners, welding, adhesive, etc. The webbing 22 and the second webbing 24 may be attached to the harness beam 44. As shown in FIGS. 1-5, the vehicle 10 may include two webbing assemblies 34, i.e., two webbings 22, two second webbings 24, and two tongues 26. For example, each webbing assembly 34 may be connected to a separate one of the two seat belt buckles 18, as shown in FIGS. 1 and 2. Alternatively, there may be any suitable number of webbing assemblies 34. The webbing 22 and the second webbing 24 may be formed of any suitable material, for example, nylon, polyester, etc. The webbing 22 may be formed of the same material or different material as the second webbing 24.

As set forth above, the webbing assembly 34 includes the tongue 26 attached to the webbing 22. As one example, the tongue 26 may be attached to the second webbing 24, e.g., the tongue 26 may be attached to both the webbing 22 and the second webbing 24, or the tongue 26 may be attached to either the webbing 22 or the second webbing 24. The tongue 26 may be attached to the webbing 22 and/or the second webbing 24 in any suitable manner, for example, by fasteners, welding, adhesive, etc. As one example, the tongue 26 may be fixed to the webbing 22 and/or the second webbing 24. That is, the tongue 26 may be securely attached to the webbing 22 and/or the second webbing 24. As another example, the tongue 26 may be rotatably attached, slidably attached, etc. to the webbing 22 and/or the second webbing 24.

Figure 5:
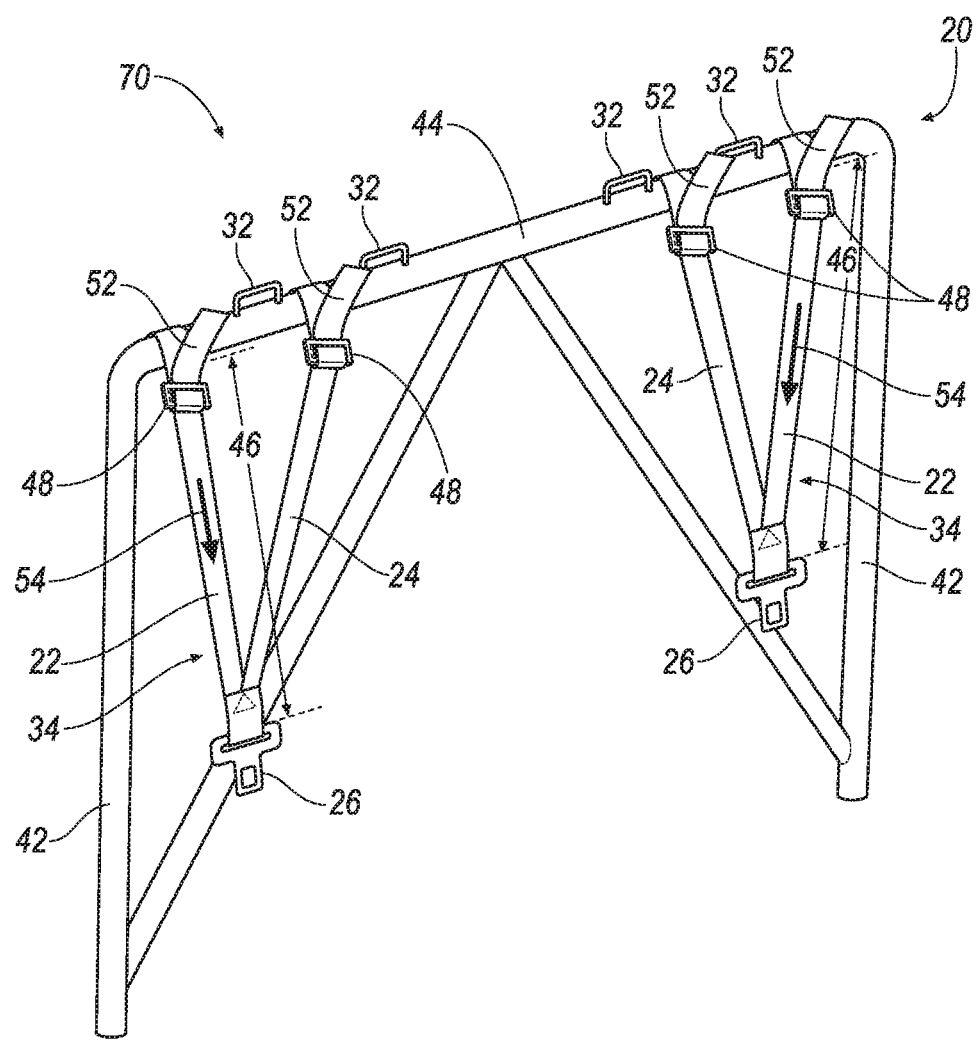
FIG. 5 is a perspective view of the harness bar assembly.

As set forth above, the tongue 26 is engageable with the seat belt buckle 18. For example, the tongue 26 and the seat belt buckle 18 may be moveable between an engaged position (FIGS. 1-2) and an unengaged position (FIGS. 3-5). In the engaged position, the tongue 26 is engaged with the seat belt buckle 18, e.g., the tongue 26 is attached to the seat belt buckle 18. For example, the tongue 26 may be engaged with the slot of the seat belt buckle 18 in the engaged position. In the unengaged position, the tongue 26 is not engaged with the seat belt buckle 18, e.g., the tongue 26 is not attached to the seat belt buckle 18. As shown in FIGS. 1-5, the vehicle 10 may include two tongues 26. Alternatively, there may be any suitable number of tongues 26.

With reference to FIG. 5, the webbing 22 and the second webbing 24 may each have a length 46 from the harness bar 20 to the tongue 26. The webbing 22 and the second webbing 24 may each include an adjustment mechanism 48 designed to adjust the length 46 of the webbing 22 and the length of the second webbing 24. The adjustment mechanism 48 may be any suitable mechanism, for example, a three bar slide, a knot, a ratchet, etc. For example, the webbing 22 and the second webbing 24 may each include a portion 52 that extends beyond the adjustment mechanism 48. The portion 52 may not be included in the length 46, and the length 46 may be decreased by increasing the length of the portion 52.

With continued reference to FIG. 5, the webbing 22, 24 may extend in a first direction 54 from the harness bar 20 to the tongue 26. The first direction 54 may be in a generally vehicle-rearward direction when the tongue 26 and the seat belt buckle 18 are in the engaged position. The webbing 22, 24 may be designed to stretch in the first direction 54 when a tension force is exerted on the webbing 22, 24 in the first direction 54. For example, when the tongue 26 and the seat belt buckle 18 are in the engaged position, the webbing 22, 24 may be substantially taut from the harness bar 20 to the seat belt buckle 18. When the tension force is exerted on the webbing 22, 24, the webbing 22, 24 may stretch beyond the length 46 of the substantially taut webbing 22, 24. The tension force may be the result of, for example, a vehicle accident, intense vehicle braking, etc.

The webbing 22, 24 may be a fabric having a weave pattern. An amount in which the webbing 22, 24 stretches in the first direction 54 when the tension force is exerted on the webbing 22, 24 in the first direction 54 may be determined by at least the weave pattern of the fabric. As another example, an amount in which the webbing 22, 24 stretches in the first direction 54 when the tension force is exerted on the webbing 22, 24 in the first direction 54 may be determined by at least the material of the webbing 22, 24.

With reference to FIG. 2, the vehicle 10 may include a multi-point harness 28. The multi-point harness 28 may include a shoulder strap 58, a second shoulder strap 60, two lap belts 62, an anti-submarine belt 64, and a front seat belt buckle 66. In this configuration, the multi-point harness 28 may be a five-point harness, i.e., there may be five points of contact between the multi-point harness 28 and the vehicle 10. The shoulder strap 58 and the second shoulder strap 60 may be attached to the harness bar 20, and the two lap belts 62 and the anti-submarine belt 64 may be attached to the vehicle 10 at any suitable location, for example, the front seat 14. The multi-point harness 28 may be formed of the same material as the webbing 22, or any other suitable material, for example, nylon, polyester, etc.

With reference to FIGS. 1-4, the vehicle 10 may include the shoulder strap 58 attached to the harness bar 20. The vehicle 10 may include the second shoulder strap 60 attached to the harness bar 20. The shoulder strap 58 and the second shoulder strap 60 may be attached to the harness bar 20 in any suitable manner, for example, by fasteners, welding, adhesive, etc. The shoulder strap 58 and the second shoulder strap 60 may extend from the harness bar 20 toward the front seat 14 in a generally vehicle-forward direction. As shown in FIGS. 1, 3, and 4, the vehicle may include two shoulder straps 58 and two second shoulder straps 60. Alternatively, there may be any suitable number of shoulder straps 58 and second shoulder straps 60.

With reference to FIG. 2, the vehicle 10 may include the front seat belt buckle 66 supported by the front seat 14. The front seat belt buckle 60 may be of a conventional type, e.g., may be factory installed. The front seat belt buckle 66 may be supported by the front seat 14 in any suitable manner, for example, by fasteners, welding, adhesive, etc., as is known. The vehicle 10 may include a front tongue 30 attached to the shoulder strap 58. The front tongue 30 may be attached to the shoulder strap 58 in any suitable manner, for example, by fasteners, welding, adhesive, etc.

The front tongue 30 may be engageable with the front seat belt buckle 66. The front seat belt buckle 66 may include a slot (not shown) and a button (not shown), as is known. The slot may be configured to receive the front tongue 30. The button may be configured to release the front tongue 30 from the front seat belt buckle 66. The multi-point harness 28 may include multiple tongues engageable with the front seat belt buckle 66. The multi-point harness 28 and the front seat belt buckle 66 may be movable between an engaged position (FIG. 2) and an unengaged position (not shown). In the engaged position, at least the front tongue 30 is engaged with the front seat belt buckle 66, e.g., at least the front tongue 30 is attached to the front seat belt buckle 66. For example, the front tongue 30 may be engaged with the slot of the front seat belt buckle 66. In the unengaged position, at least the front tongue 30 is not engaged with the front seat belt buckle 66, e.g., at least the front tongue 30 is not attached to the front seat belt buckle 66.

With reference to FIGS. 1-4, the front seat 14 may include two apertures 40. One of the two apertures 40 may be configured to receive the shoulder strap 58 and the other of the two apertures 40 may be configured to receive the second shoulder strap 60. For example, the shoulder strap 58 and the second shoulder strap 60 may traverse the apertures 40. A point on the shoulder strap 58 at which the shoulder strap 58 traverses the aperture 40 may be between a point on the shoulder strap 58 at which the shoulder strap 58 is attached to the harness bar 20 and the front tongue 30. As another example, the shoulder strap 58 and the second shoulder strap 60 may extend through, across, around, etc. the front seat 14 in any suitable manner.

The vehicle 10 may include a guide 32 attached to the harness bar 20. The guide 32 may be attached to the harness bar 20 in any suitable manner, for example, by fasteners, welding, adhesive, etc. As another example, the guide 32 may be integrally formed with the harness bar 20, i.e., the guide 32 and the harness bar 20 are a continuous one-piece unit. The guide 32 may be generally arch-shaped, or any other suitable shape. As shown in FIGS. 1-5, the vehicle 10 may include four guides 32. Alternatively, there may be any suitable number of guides 32. The guide 32 may be formed of the same material as the harness bar 20, or any other suitable material, for example, steel, aluminum, etc.

With reference to FIGS. 1-4, a portion of the shoulder strap 58 may be disposed between the guide 32 and the harness bar 20. For example, the shoulder strap 58 may abut the harness bar 20 and the guide 32 may be attached to the harness bar 20 and extend over the shoulder strap 58. As another example, the shoulder strap 58 may abut the harness bar 20 and the guide 32. A portion of the second shoulder strap 60 may be disposed between another of the guides 32 and the harness bar 20 in a similar manner to the shoulder strap 58, or in any other suitable manner.

In light of the foregoing, the operation of the harness bar assembly 70 will now be described. The harness bar assembly 70 may be installed in the vehicle 10 by attaching the harness bar 20 (e.g., the support beams 42) to the front seat rails 36. As another example, the harness bar 20 (e.g., the support beams 42) may be attached to the bracket 68 and the bracket 68 may be attached to the floor 38. Alternatively, the harness bar 20 may be attached to the body 12 of the vehicle 10 in any suitable manner.

The tongue 26 and the seat belt buckle 18 may be moved to the engaged position, i.e., the tongue 26 may be engaged with the seat belt buckle 18. The length 46 of the webbing 22, 24 may be adjusted by the adjustment mechanism 48 until the webbing 22, 24 is substantially taut from the harness bar 20 to the seat belt buckle 18. As one example, the portions 52 of the webbing 22, 24 may be pulled through the adjustment mechanisms 48 until the webbing 22, 24 is substantially taut from the harness bar 20 to the seat belt buckle 18. Alternatively, the length 46 of the webbing 22, 24 may be adjusted in any suitable manner.

The shoulder straps 58, 60 may extend from the harness bar 20 toward the front seat 14 in the generally vehicle-forward direction. As one example, the shoulder straps 58, 60 may traverse the apertures 40. As another example, the shoulder straps 58, 60 may extend through, across, around, etc. the front seat 14 in any suitable manner. The front tongue 30 and the front seat belt buckle 66 may be moved to the engaged position, i.e., the front tongue 30 may be engaged with the front seat belt buckle 66. A length of the shoulder straps 58, 60 may be adjusted until the shoulder straps 58, 60 are substantially taut from the harness bar 20 to the front seat belt buckle 66.

As shown in FIG. 2, the front tongue 30 and the front seat belt buckle 66 are in the engaged position, the tongue 26 and the seat belt buckle 18 are in the engaged position, and the webbing 22, 24 and the shoulder straps 58, 60 are substantially taut. In this configuration (FIG. 2), the webbing 22, 24 and the shoulder straps 58, 60 may generate counteracting forces on the harness bar 20.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
   a body;
   a front seat and a rear seat each supported by the body;
   a seat belt buckle supported by the rear seat;
   a harness bar supported by the body and disposed between the front seat and the rear seat;
   a webbing attached to the harness bar; and
   a tongue attached to the webbing and engaged with the seat belt buckle.

2. The vehicle of claim 1, further comprising a shoulder strap attached to the harness bar.

3. The vehicle of claim 2, further comprising a front seat belt buckle supported by the front seat and a front tongue attached to the shoulder strap, the front tongue being engageable with the front seat belt buckle.

4. The vehicle of claim 2, further comprising a guide attached to the harness bar, wherein a portion of the shoulder strap is disposed between the guide and the harness bar.

5. The vehicle of claim 1, wherein the body includes front seat rails, and the front seat and the harness bar are each supported by the front seat rails.

6. The vehicle of claim 1, wherein the body includes a floor, and the harness bar is supported by the floor.

7. The vehicle of claim 1, wherein the webbing has a length from the harness bar to the tongue, and the webbing including an adjustment mechanism designed to adjust the length of the webbing.

8. The vehicle of claim 1, wherein the tongue is fixed to the webbing.

9. The vehicle of claim 1, further comprising a second webbing attached to the harness bar, wherein the tongue is attached to the second webbing.

10. The vehicle of claim 1, wherein the webbing extends in a first direction from the harness bar to the tongue, and the webbing being designed to stretch in the first direction when a tension force is exerted on the webbing in the first direction.

11. The vehicle of claim 10, wherein the webbing is a fabric having a weave pattern, and an amount in which the webbing stretches in the first direction when a tension force is exerted on the webbing in the first direction is determined by at least the weave pattern of the fabric.

12. The vehicle of claim 1, wherein the harness bar is tubular.

13. A harness bar assembly comprising:
   a harness bar configured to attach to a body of a vehicle;
   a webbing attached to the harness bar;
   a tongue attached to the webbing, the tongue being configured to engage a seat belt buckle on a rear seat of the vehicle;
   a shoulder strap attached to the harness bar; and
   a front tongue attached to the shoulder strap, the front tongue being configured to engage a front seat belt buckle on a front seat of the vehicle.

14. The harness bar assembly of claim 13, further comprising a guide attached to the harness bar, wherein a portion of the shoulder strap is disposed between the guide and the harness bar.

15. The harness bar assembly of claim 13, wherein the webbing has a length from the harness bar to the tongue, and the webbing including an adjustment mechanism designed to adjust the length of the webbing.

16. The harness bar assembly of claim 13, wherein the webbing extends in a first direction from the harness bar to the tongue, and the webbing being designed to stretch in the first direction when a tension force is exerted on the webbing in the first direction.

17. The harness bar assembly of claim 16, wherein the webbing is a fabric having a weave pattern, and an amount in which the webbing stretches in the first direction when a tension force is exerted on the webbing in the first direction is determined by at least the weave pattern of the fabric.

18. The harness bar assembly of claim 13, wherein the harness bar is tubular.

19. A vehicle comprising:
   a body;
   a front seat and a rear seat each supported by the body;
   a seat belt buckle supported by the rear seat;
   a harness bar supported by the body and disposed between the front seat and the rear seat;
   a webbing attached to the harness bar; and
   a tongue attached to the webbing, the tongue being engageable with the seat belt buckle;
   wherein the webbing has a length from the harness bar to the tongue, and the webbing including an adjustment mechanism designed to adjust the length of the webbing.

* * * * *